(12) United States Patent
Babej

(10) Patent No.: US 8,096,743 B2
(45) Date of Patent: Jan. 17, 2012

(54) PRESS-IN ELEMENT FOR PRESSING INTO A NON-PIERCED OR PIERCED COMPONENT AND ALSO METHOD FOR THE MANUFACTURE OF THE PRESS-IN ELEMENT

(75) Inventor: Jiri Babej, Lich (DE)

(73) Assignee: Profil Verbindungstechnik GmbH & Co., KG (DE)

( * ) Notice: Subject to any disclaimer, the term of this patent is extended or adjusted under 35 U.S.C. 154(b) by 599 days.

(21) Appl. No.: 12/178,086

(22) Filed: Jul. 23, 2008

(65) Prior Publication Data

US 2009/0028662 A1    Jan. 29, 2009

(30) Foreign Application Priority Data

Jul. 26, 2007   (DE) .................. 10 2007 034 987

(51) Int. Cl.
*F16B 37/04*  (2006.01)
(52) U.S. Cl. .................. 411/179; 411/180; 411/188
(58) Field of Classification Search .................. 411/176, 411/177, 179, 180, 187, 188, 501
See application file for complete search history.

(56) References Cited

U.S. PATENT DOCUMENTS

| | | | | |
|---|---|---|---|---|
| 2,685,320 A | * | 8/1954 | Rosan | 411/180 |
| 3,133,579 A | * | 5/1964 | Grimm et al. | 411/180 |
| 3,405,752 A | * | 10/1968 | Neuschotz | 411/180 |
| 3,461,936 A | * | 8/1969 | Rosan, Sr. | 411/180 |
| 4,893,976 A | * | 1/1990 | Milliser et al. | 411/180 |
| 5,244,326 A | * | 9/1993 | Henriksen | 411/180 |
| 5,513,933 A | * | 5/1996 | Rom | 411/180 |
| 5,613,815 A | * | 3/1997 | Muller | 411/181 |
| 5,743,691 A | * | 4/1998 | Donovan | 411/180 |

(Continued)

FOREIGN PATENT DOCUMENTS

CA    2 185 807    7/2005

(Continued)

OTHER PUBLICATIONS

Translation of German Search Report dated Apr. 1, 2009 relating to German Patent Application No. 10 2007 034 987.6.

(Continued)

*Primary Examiner* — Flemming Saether
(74) *Attorney, Agent, or Firm* — Hershkovitz & Associates LLC; Abraham Hershkovitz; Eugene C. Rzucidlo

(57) ABSTRACT

A press-in element for pressing into a non-pierced or pre-pierced component, in particular a sheet metal part is described. The press-in element has a head part having a ring surface confronting the component and a neck part which projects away from the ring surface, i.e. from the component contact side. The head part further has a ring-like projection surrounding the neck part with a radial spacing and projecting away from the ring surface and the neck part has a radially outwardly projecting ring bead, which can be formed as a continuous ring bead or as a ring bead interrupted at points, with the apex of the ring bead having an axial spacing from the ring surface which is larger than the axial spacing of the apex of the ring-like projection from the ring surface, which lies radially within this projection and together with it and the ring bead forms a pocket which receives material of the component.

20 Claims, 3 Drawing Sheets

U.S. PATENT DOCUMENTS 5,797,175 A * 8/1998 Schneider .................. 29/520
6,125,524 A * 10/2000 Mueller .................... 29/520

FOREIGN PATENT DOCUMENTS

| DE | 29522323 U1 | 9/2001 |
| EP | 0 784 161 | 7/1997 |
| EP | 0 678 679 B1 | 6/1998 |
| EP | 08 56 670 A1 | 8/1998 |
| EP | 0 958 100 B1 | 11/2003 |
| WO | WO 82/02579 A13 | 8/1982 |
| WO | WO 94/01688 | 1/1994 |
| WO | WO 95/27147 A1 | 10/1995 |
| WO | WO 2005/050034 A1 | 6/2005 |

OTHER PUBLICATIONS

European Search Report corresponding to EP 08 01 2929.9 dated Apr. 6, 2011.
English language translation of European Search Report corresponding to EP 08 01 2929.9 dated Apr. 6, 2011.

* cited by examiner

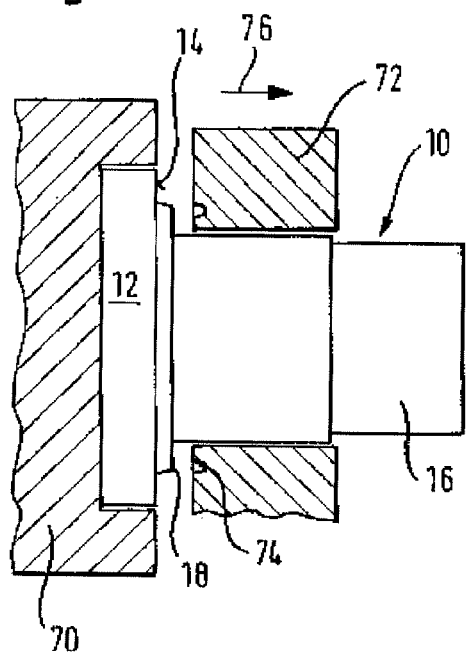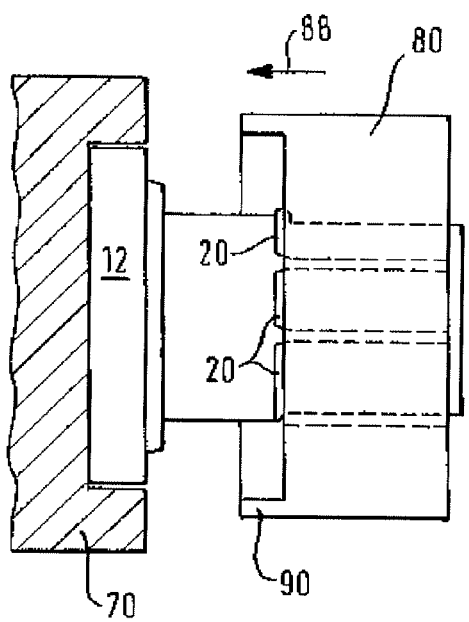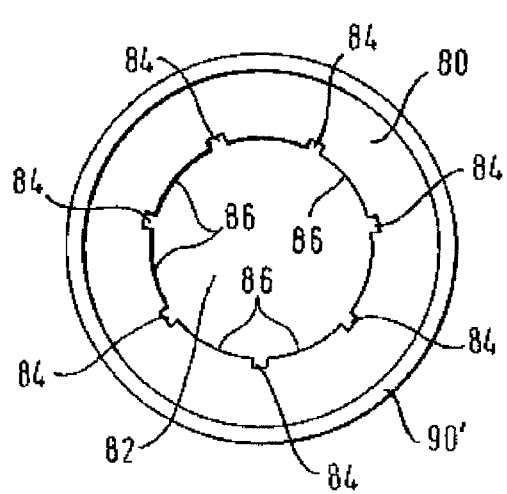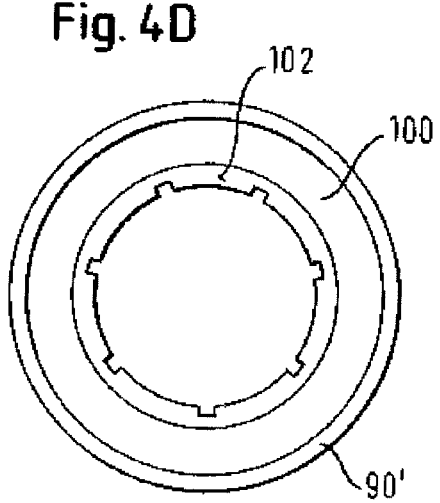

PRESS-IN ELEMENT FOR PRESSING INTO A NON-PIERCED OR PIERCED COMPONENT AND ALSO METHOD FOR THE MANUFACTURE OF THE PRESS-IN ELEMENT

FIELD OF THE INVENTION

The present invention relates to a press-in element for pressing into a non-pierced or pre-pierced component, in particular into a sheet metal part, and also to a method for the manufacture of such a press-in element.

BACKGROUND OF THE INVENTION

Press-in elements are known, for example from document EP 0678679 B1. There an element which can be inserted into a sheet metal part is claimed which consists of a shaft part and a head part formed in one piece thereon, with the element having concave peripherally closed fields at its underside which serves as a contact surface and also at least one recess extending spirally around the shaft part. The spiral recess is preferably formed by a thread groove consequently also bounded by a thread turn which can be regarded as a ring bead. The elements can be realized as a nut element or as a bolt element. The element described there has proved itself in practice but is however not necessarily suited for usually very thick sheet metal parts (for example with a thickness of 4 mm or larger).

A modified variant of the elements is furthermore known from EP 0958100 B1 and indeed there in the form of a bolt element which can be introduced in self-piercing manner into a sheet metal part, but which can also be introduced into a pre-pierced metal sheet. The element is in particular suitable for being used in relatively thin metal sheets, i.e. of up to approximately 2 mm thickness. The design of the element in the region of the head part corresponds largely to the design of the element in accordance with the above-named document EP 0678679 B1.

Furthermore, reference should be made at this point to WO 94/01688 which describes a press-in part as a fastener element in the form of a bolt, a screw or an internal thread carrier acting as a type of nut and indeed in order to obtain a joint to a sheet metal part which is resistant to press-out and rotation. In this connection the element has head part of larger diameter having a contact surface substantially radial to the longitudinal axis, a shaft part of smaller diameter extending at one side in the axial direction beyond the contact surface and, in the transition region between the head part and the shaft part, a radially outwardly open restriction concentric to the longitudinal axis as a ring space for the accommodation of the sheet metal material. The radially outwardly open restriction is formed by a ring projection which extends in the radial direction and surrounds the shaft part.

In all the above explained known elements the sheet metal material is moved radially into a ring recess or a thread turn formed by the ring projection or a thread turn by a die button arranged below the sheet metal part which has a special form in order to bring about this material flow, i.e. into the radially open ring recess and optionally into the concave fields. This manner of proceeding is entirely practicable for sheet metal parts up to about 2.5 or 3 mm. However, when the sheet metal part becomes significantly thicker it is not possible or hardly any longer possible to introduce sheet metal material into the corresponding ring recess by the action of a die button.

SUMMARY OF THE INVENTION

The object of the present invention is to provide help here by providing an element which can also be used in thick sheet metal parts, i.e. with sheet metal thicknesses of 3 mm or larger (but also in thinner sheet metal if required), but nevertheless to ensure that material of the sheet metal parts can be pressed into a corresponding ring recess of the element making a special design of the die button unnecessary. Furthermore, the element should be made self-piercing, at least in some embodiments and it should moreover enable a good resistance against rotation relative to the sheet metal part when the element is formed as a nut element or as a bolt element.

In order to satisfy this object, there is provided, in accordance with the invention, a press-in element for pressing into a non-pierced or pre-pierced component, in particular a sheet metal part, wherein the press-in element has a head part having a ring surface confronting the component and a neck part which projects away from the ring surface, i.e. from the component contact side, wherein the head part further has a ring-like projection surrounding the neck part with a radial spacing and projecting away from the ring surface and the neck part has a radially outwardly projecting ring bead, which can be formed as a continuous ring bead or as a ring bead interrupted at points, with the apex of the ring bead having an axial spacing from the ring surface which is larger than the axial spacing of the apex of the ring-like projection from the ring surface, which lies radially within this projection and together with it and the ring bead forms a pocket which receives material of the component.

In the press-in element in accordance with the invention the head part of the element is thus equipped with a ring-like projection which, on pressing of the element into the sheet metal part itself ensures that material is pressed out of the sheet metal part into the pocket formed between this projection and the ring bead of the neck part of the element. Since the projection comes directly into contact with the surface of the sheet metal part, and indeed adjacent to the pocket, only a relatively restricted material displacement is necessary in order to fill the pocket with sheet metal material and to hereby produce the required press-out resistance. Moreover, this material deformation takes place without making a special form of the die button necessary. It is only necessary for the sheet metal part to be supported on a planar end face of the die button in order to produce the material displacement by pressure onto the head part of the element and thus onto the surface of the sheet metal part.

The ring-like projection of the head part of the element can subdivide the said component contact surface into a radially outer ring surface, which normally forms the sheet metal contact surface and into a radially inner ring surface, with the radially inner ring surface bounding said pocket or co-forming it and likewise being able to serve as an additional contact surface. This design is however not essential. The ring-like projection which surrounds the neck part with the radial spacing could also be provided radially outwardly at the head part, whereby the surface of the head part lying radially inside the ring-like projection forms the sheet metal contact surface and simultaneously bounds the said pocket.

It is particularly favourable when the element has ribs providing security against rotation which extend in the axial direction and which on being pressed into the sheet metal part form corresponding grooves in the hole wall of the hole of the sheet metal part and take care of the required security against rotation. In this connection the press-in element can be manufactured in such a way that, by means of a suitable cold heading die, material can be displaced from an originally cylindrical neck part in the direction of the head part and indeed at a plurality of discrete positions around the neck part so that ribs providing security against rotation remain between these positions and the so displaced material form ring segments of the ring bead. In this manner a ring bead interrupted at certain positions is formed. As a result of the selected axial length of the ribs providing security against rotation, which can for example extend over half the length of the neck part (with this statement in no way being intended to be regarded as restrictive since the ribs providing security against rotation could also be longer or shorter) the ring segments of the ring bead can be formed with a radial dimension which significantly exceeds the radial dimension of the ribs providing security against rotation. The ring bead is then of less pronounced design at the positions of the ribs providing security against rotation, i.e. recesses in the ring bead can be found at these positions which are however not disturbing but rather simply give the impression that ring bead is interrupted at the corresponding positions. These interrupted positions can indeed produce an additional security against rotation.

The element can be formed as a nut element and then has a thread which extends through the head part and the neck part. As an alternative the element can be provided with a shaft part and can thus be designed as a bolt element. For this two different possibilities exist. On the one hand the shaft part can extend away from the end face of the head part remote from the neck part or it can extend from the end of the neck part remote from the head part.

In the first two variants, the element can be straightforwardly made self-piercing, i.e. the free end of the neck part, that is to say the end of the neck part remote from the head part can be provided with a sharp piercing edge which serves for the cutting out of a piercing slug from the sheet metal material. These two variants of the press-in element can however also be used in pre-pierced sheet metal parts, i.e. the hole for receiving the press-in element is pre-pierced.

In the third variant, i.e. with the design of the element as a bolt element with a shaft part which extends away from the end of the neck part remote from the head part, it is difficult to pierce the sheet metal part with the shaft part as the shaft part can be hereby damaged, in particular when it is a bolt element having a thread. Nevertheless it is conceivable to pre-pierce the sheet metal part and indeed with a diameter which is smaller than the outer diameter of the neck part in the region of the piercing edge. The element could then be so used that the free end of the neck part, which is formed as a piercing edge, cuts a cylindrical slug out of the sheet metal part and hereby corresponding calibrates the sheet metal part. On pressing the neck part into the sheet metal part the ribs providing security against rotation form corresponding grooves in the hole wall. A bolt element of this kind also has the advantage that the pre-piercing does not have to be made 100% accurately, because when piercing out a cylindrical piercing slug this can have a certain asymmetry. In other words the tolerances in such a variant can entirely be generously dimensioned, which makes the method as a whole more price-worthy.

BRIEF DESCRIPTION OF THE FIGURES

The invention will now be explained in more detail in the following with reference to embodiments and to the drawings which show.

DETAILED DESCRIPTION OF THE INVENTION

Figure 1:
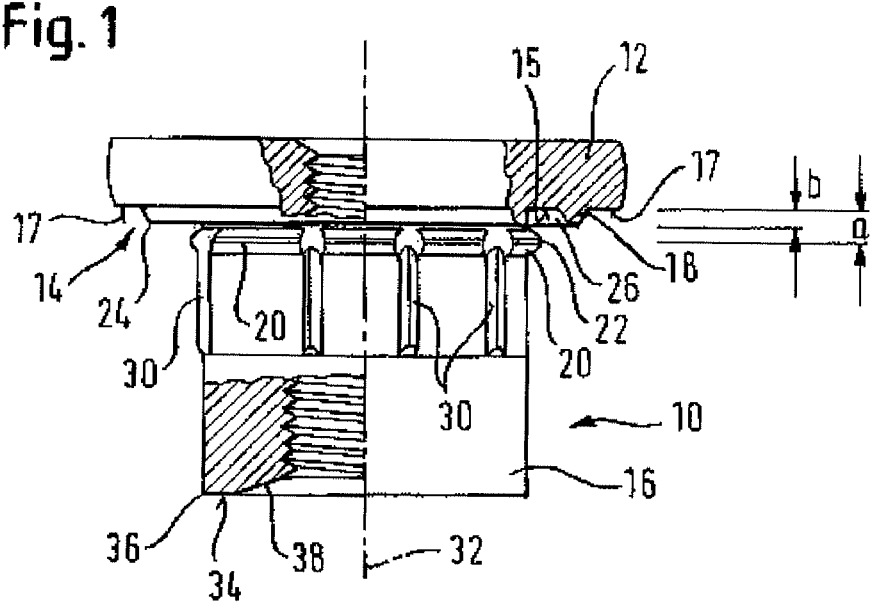
FIG. 1 a partly sectioned representation of a press-in element in the form of a nut element, FIG. 2 a partly sectioned representation of a press-in element in the form of a bolt element, FIG. 3 a further example in accordance with the invention for a press-in element realized as a bolt element here also in a partly sectioned representation, FIGS. 4A-4D a series of sketches to show the manufacture of a press-in element in accordance with the invention by means of cold heading and FIG. 5 a representation corresponding to FIG. 1 but with the press-in element pressed into a sheet metal part.

A press-in element 10 in accordance with the invention for pressing into a non-pierced or pre-pierced component, in particular a sheet metal part, is shown in FIG. 1, with the press-in element 10 having a head part 12 with a ring surface 15 facing the component and a neck part 16 which projects away from the ring surface 15, i.e. from the component contact side 14, with the head part furthermore having a ring-like projection 18 which surrounds the neck part with a radial spacing and projecting away from the ring surface and with the neck part having a radially outwardly projecting bead 20 which can be formed as a continuous ring bead or as a ring bead which is interrupted at certain positions (as shown in FIG. 1). The apex 22 of the ring bead has an axial spacing a from the ring surface 15 which is larger than the axial spacing b of the tip 24 of the ring-like projection from the ring surface 15 which is disposed radially inside of this projection and forms with it and with the ring bead a pocket 26 which receives material of the component.

In the embodiment of FIG. 1 the component side 14 is subdivided into a radially outer ring surface 17 and a radially inner ring surface 15 which are arranged radially outside and inside the ring-like projection 18 respectively. This is however not essential, as the projection 18 could be arranged radially outwardly at the head part 12 at the component side 14.

In the illustrated embodiment ribs 30 providing security against rotation are provided at the neck part 16 they finish at their ends adjacent the head part at the ring bead 18 of the neck part 16. Furthermore the ribs 30 providing security against rotation extend over approximately half the axial length of the neck part 16. In this connection the ribs providing security against rotation extend in directions parallel to the central longitudinal axis 32 of the press-in element. They are preferably regularly arranged at the neck part 16 around the central longitudinal axis 32.

The free end 34 of the neck part, i.e. the end which is remote from the head part is formed as a piercing section, with the peripheral edge 36 of the neck part 16 being formed radially outwardly at the free end 34 as a sharp piercing edge. Furthermore, the free end 34 of the neck part has a conical recess 38 with a relatively shallow enclosed cone angle which, for example, lies in the range between 170 and 90°.

In the embodiment of FIG. 1 the press-in element is formed as a hollow element and is provided in this embodiment with an inner thread 39.

Figure 2:
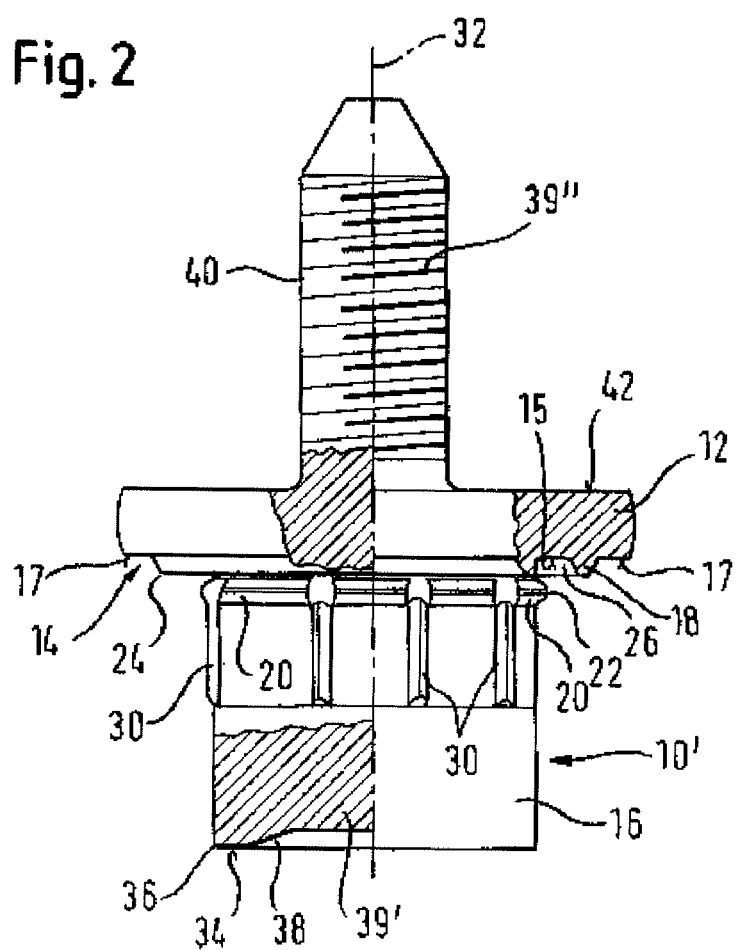
Figure 3:
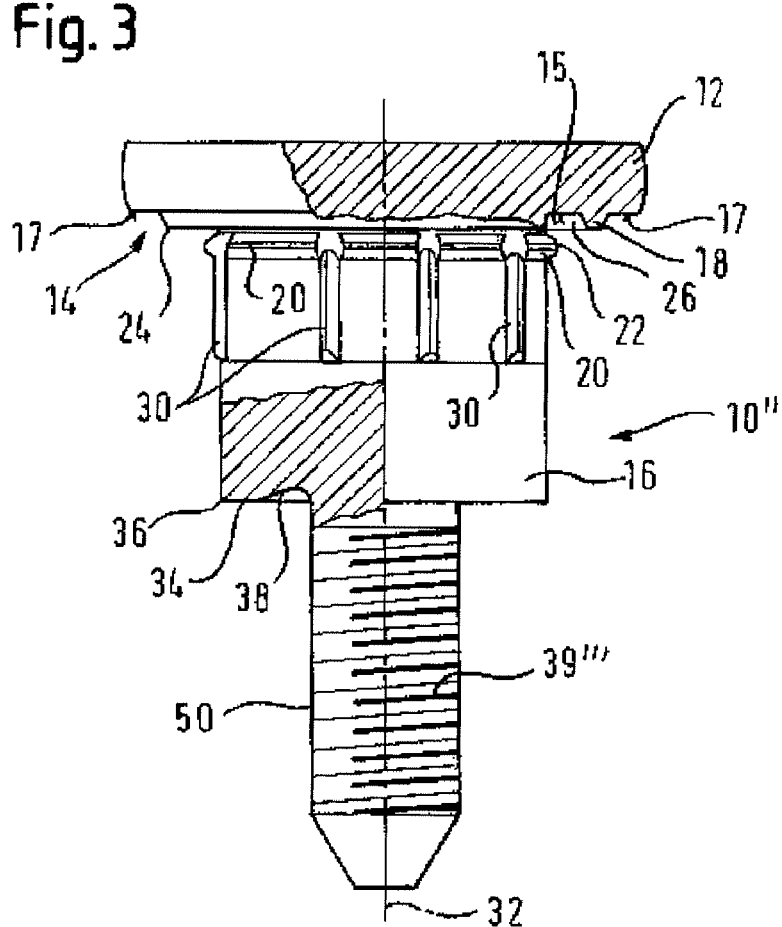

As an alternative to this the press-in element can, as shown in FIG. 2, be formed as a bolt element 10' and then has a shaft part 40 which is arranged at the side 42 of the head part 12 remote from the neck part 16. Otherwise the design of the head part 12 and the neck part corresponds extensively with the embodiment of FIG. 1 with the exception of the missing internal thread 39 (which is being replaced by a solid design of the head part with base 39'), which is why the same reference numerals have been used in FIG. 2 as in FIG. 1 in this region and the previous description likewise applies for the embodiment of FIG. 2 and will not therefore be repeated. This also applies for the embodiment in accordance to FIG. 3. In FIG. 3 a press-in element 10" is shown as a bolt element having a shaft part 50 which is arranged at the end of the neck part 16 and remote from the head part, with the shaft part 50 having a smaller diameter than the outer diameter of the neck part 16.

Both in the embodiment of FIG. 2 and also in the embodiment of FIG. 3 the shaft part 40 or 50 respectively is provided with an external thread 39", 39'".

Figure 5:
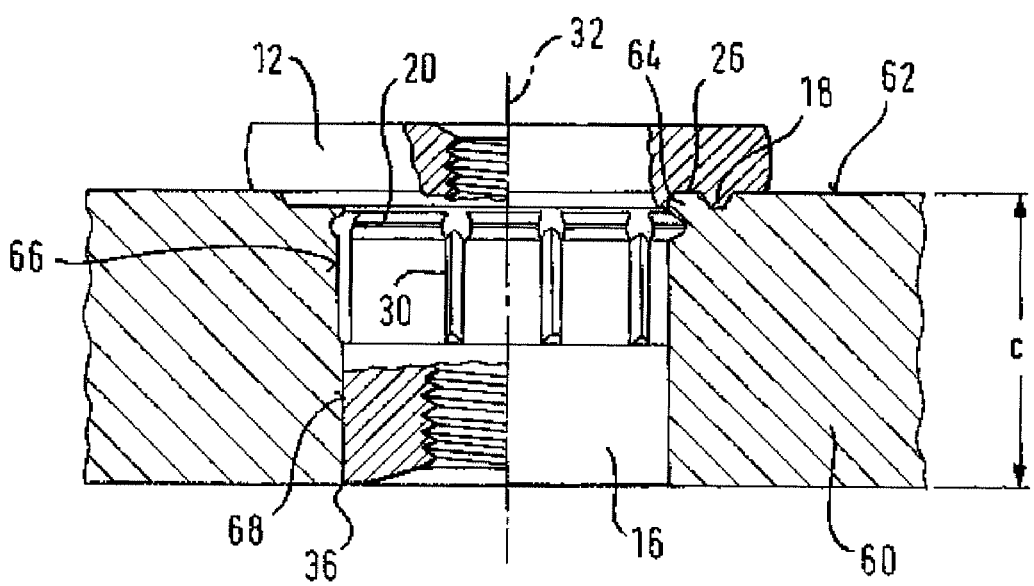

In the attachment of the press-in element in accordance with FIG. 1 to a sheet metal part a component assembly arises in accordance with FIG. 5 with the ring-like projection projecting away from the ring surface having being pressed into the surface 62 of the sheet metal part and the material 64 which has been displaced hereby being located in the pocket 28. In this way the press-in element is anchored in a manner secured against press-out in the sheet metal part. The press-in element 10 has in this embodiment been pressed in a self-piercing manner into the sheet metal part, i.e. the piercing edge 36 has cut a cylindrical piercing slug (not shown) out of the sheet metal part which is arranged on a (likewise not shown) die button having a cylindrical hole with a diameter corresponding to the outer diameter of the neck part 16. The press-in element could however also be inserted into a pre-pierced or pre-drilled sheet metal part.

In the component assembly in accordance with FIG. 5 the ribs 30 providing security against rotation which are provided radially outwardly at the neck part 16 are arranged in corresponding grooves 66 providing security against rotation in the hole wall 68 of the pierced sheet metal part 60.

The thickness of the sheet metal part 60 in the region of the attachment of the press-in element corresponds approximately to the spacing c between the said ring surface 15 of the head part and the free end 34 of the neck part 16, i.e. to the axial length of the neck part, is however normally fractionally smaller so that the sheet metal part is fully drilled through. The previous description of the component assembly applies extensively also for a component assembly which arises using the press-in element in accordance with FIG. 2 or FIG. 3. In an embodiment of the component assembly in accordance with FIG. 3 it would however be difficult to pierce the hole in the sheet metal part by means of the press-in element because the thread 39'" of the shaft part would if anything prevent this. The sheet metal part would therefore in this case have to be pre-pierced or pre-drilled, either with a diameter which corresponds to that of the neck part 16 or somewhat smaller, but nevertheless larger than the outer diameter of the sheet metal part. In this case the sharp piercing edge 36 could pierce a hollow cylindrical piercing slug out of the component.

In a practical embodiment of a press-in element in accordance with FIG. 1 having an internal thread with the size M8, the neck part could have an axial length of 7.2 mm and an outer diameter of 13.6 mm and could be self-piercingly introduced into a sheet metal part having a thickness of 7 mm. In this connection the spacing "a" amounts to 1 mm and the spacing "b" to approximately 1.5 mm. The outer diameter of the head could amount to approximately 16 mm and its thickness (axial height) to 3 mm.

The method for the manufacture of a press-in element in accordance with the present description can take place in such a way that the ring bead is formed by axial displacement of material of the neck part.

FIG. 4A shows a blank for the press-in element 10 in accordance with FIG. 1 with the head part 12 of the element being arranged in a holder 70 of a cold heading machine. The reference numeral 72 indicates a tool which has just been pressed against the component contact side 14 of the head part 12 in order to form the ring-like projection 18. For this purpose the tool 72 has a corresponding recess 74 in its end face confronting the head part. Since the ring projection 18 has been finished the tool 72 is being removed from the holder 70 in accordance with the arrow 76 in the illustration in accordance with FIG. 4A. FIG. 4B then shows a representation similar to FIG. 4A but a further tool 80 is now being used, and indeed with a design which is shown in plan view in FIG. 4C. One notes that the tool 80 has a cylindrical region 82 which is guided on the neck part 16 of the blank and that longitudinal grooves 84 are provided in the cylindrical wall of the cylindrical recess 82. Circular portions 86 are located between the longitudinal grooves 84, with the circular portions 86 serving on movement of the tool 80 in the direction of the arrow 88 towards the holder 70 to displace or scrape away material from the fractional larger region of the neck part 16 in order to form the ring bead 20, i.e. in this case ring bead segments 20 which are spaced apart position-wise from one another by ribs providing security against rotation which are formed by the grooves 84 between the movement 88 of the tool 80. When the tool 80 has reached its maximum approach to the holder 70 which is limited by the spacer ring 90 then the manufacture of the ribs 30 providing security against rotation at the positions of the grooves 84 and the rough form of the projection 20 is finished. The tool 80 is then exchanged for a further tool 100 which is shown in end view in FIG. 4D. This tool corresponds essentially to the tool in accordance with FIG. 4B but with the exception that a conical surface 102 is provided which leads to the ring bead receiving the design with tip 22 which is shown in FIG. 1.

A spacer ring 90' is also provided here which has the same action as the spacer ring 90 in accordance with FIG. 4B and FIG. 4C. Although the grooves 84 are shown here as rectangular grooves they could for example be provided with a triangular cross-section, whereby ribs providing security against rotation arise with a likewise rectangular cross-section, as shown in FIG. 1.

In all embodiments all materials can be named as an example for the material of the press-in element which achieve the strength values of class 8 in accordance with the ISO standard in the context of cold deformation, for example a 35 B2 alloy in accordance with DIN 1654. The so formed fastener elements are suitable amongst other things for all commercially available steel materials for drawing quality sheet metal parts and also for aluminium or its alloys.

The invention claimed is:

1. A press-in element (10; 10'; 10") for pressing into a non-pierced or pre-pierced sheet metal part (60), wherein the press-in element has a head part (12) having a ring surface (15) confronting the component and a neck part which projects away from the ring surface (15), the head part further having a projection (18) in the shape of a ring surrounding the neck part with a radial spacing, the projection (18) projecting away from the ring surface (15) and having an apex and the neck part having a radially outwardly projecting ring bead (20) with an apex (22), which is formed as a continuous ring bead or as a ring bead interrupted at points, with the apex (22) of the ring bead having an axial spacing (a) from the ring surface (15) which is larger than the axial spacing (b) of the apex of the projection (18) from the ring surface, the apex (22) of the ring bead lying radially within the projection (18) and the ring bead (20) and the projection (18) forming a pocket (26) which receives material of the sheet metal part (60), there being ribs (30) providing security against rotation provided at the neck part (16), the ribs coming to an end at the ring bead (20) of the neck part (16) at their ends adjacent the head part (12).

2. A press-in element in accordance with claim 1, wherein the component contact side (14) is subdivided into a radially outer ring surface (17) and a radially inner ring surface (15) which are disposed radially outside and inside of the projection (18) respectively.

3. A press-in element in accordance with claim 1, wherein the ribs (30) providing security against rotation extend over approximately half the axial length of the neck part (16).

4. A press-in element in accordance with claim 1, wherein the ribs providing security against rotation extend in directions parallel to the central longitudinal axis (32) of the press-in element (10; 10'; 10").

5. A press-in element in accordance with claim 4, wherein the ribs providing security against rotation are arranged regularly at the neck part around the central longitudinal axis.

6. A press-in element in accordance with claim 1, wherein the neck part (16) has a free end (34) remote from the head part (12) and formed as a piercing section.

7. A press-in element in accordance with claim 6, wherein the peripherally extending edge (36) of the neck part (16) is formed radially outwardly at the free end (34) as a sharp piercing edge.

8. A press-in element in accordance with claim 7, wherein the free end (34) of the neck part (16) has a conical recess (38) with a relatively shallow enclosed cone angle.

9. A press-in element in accordance with claim 8, wherein said cone angle lies in the range between 170° and 90°.

10. A press-in element (10) in accordance with claim 1, wherein it is formed as a hollow element.

11. A press-in element in accordance with claim 10, wherein the hollow press-in element (10) is formed with an internal thread (39).

12. A press-in element in accordance with claim 1, wherein the press-in element (10') is formed as a bolt element (10') and has a first shaft part (40) which is arranged at the side of the head part (12) remote from the neck part (16).

13. A press-in element in accordance with claim 12, wherein the press-in element (10") is formed as a bolt element having a second shaft part (50) which is arranged at the side of the neck part remote from the head part (12), with the second shaft part (50) having a smaller diameter than the outer diameter of the neck part (16).

14. A press-in element in accordance with claim 13, wherein the first and second shaft parts (40, 50) are each provided with an external thread (39"; 39''').

15. A press-in element in accordance with claim 12, wherein the first shaft part (40) is provided with an external thread (39").

16. A press-in element in accordance with claim 1, wherein the press-in element (10") is formed as a bolt element having a second shaft part (50) which is arranged at the side of the neck part (16) remote from the head part (12), with the second shaft part (50) having a smaller diameter than the outer diameter of the neck part (16).

17. A press-in element in accordance with claim 16, wherein the second shaft part (50) is provided with an external thread (39''').

18. A component assembly comprising a sheet metal part and a press-in element (10; 10'; 10") for pressing into a component being one of a non-pierced sheet metal part and a pre-pierced sheet metal part (60), wherein the press-in element has a head part (12) having a ring surface (15) confronting the component and a neck part which projects away from the ring surface (15), the head part further having a projection (18) in the shape of a ring surrounding the neck part with a radial spacing, the projection (18) projecting away from the ring surface (15) and having an apex and the neck part having a radially outwardly projecting ring bead (20) with an apex (22), which is formed as a continuous ring bead or as a ring bead interrupted at points, with the apex (22) of the ring bead having an axial spacing (a) from the ring surface (15) which is larger than the axial spacing (b) of the apex of the projection (18) from the ring surface, the apex (22) of the ring bead lying radially within the projection (18) and the ring bead (20) and the projection (18) forming a pocket (26) which receives material of the sheet metal part (60), there being ribs (30) providing security against rotation provided at the neck part (16), the ribs coming to an end at the ring bead (20) of the neck part (16) at their ends adjacent the head part (12) and wherein the projection (18) projecting away from the ring surface is pressed into the surface (62) of the sheet metal part (60) and the hereby displaced material (64) is located in the pocket (26).

19. A component assembly in accordance with claim 18, wherein the ribs (30) providing security against rotation which are provided radially outwardly at the neck part are arranged in corresponding grooves (66) providing security against rotation in a wall (68) of a hole of the pierced sheet metal part (60).

20. A component assembly in accordance with claim 18, wherein the thickness of the sheet metal part (60) in the region of the attachment of the press-in element corresponds approximately to the spacing (c) between the said ring surface (15) of the head part and the free end (34) of the neck part (16), i.e. to the axial length of the neck part.

\* \* \* \* \*